United States Patent [19]
Niimi et al.

[11] Patent Number: 5,996,028
[45] Date of Patent: Nov. 30, 1999

[54] COMMUNICATION APPARATUS CONTAINING PLURALITY OF IDENTIFICATION CODES AND OPERABLE FOR SPECIFIC USER BASED ON IDENTIFICATION CODE AND PRIVATE INFORMATION STORED IN DETACHABLE RECORDING MEDIUM

[75] Inventors: Tomohiro Niimi; Takeya Oikawa, both of Tokyo; Tutomu Hasegawa, Nagoya; Masahiko Kondo, Tokyo, all of Japan

[73] Assignee: Casio Computer Co., Ltd., Tokyo, Japan

[21] Appl. No.: 08/825,420

[22] Filed: Mar. 28, 1997

Related U.S. Application Data

[63] Continuation of application No. 08/506,831, Jul. 25, 1995, abandoned.

[30] Foreign Application Priority Data

| Jul. 27, 1994 | [JP] | Japan | 6-175252 |
| Aug. 18, 1994 | [JP] | Japan | 6-194026 |
| Jul. 12, 1995 | [JP] | Japan | 7-175921 |

[51] Int. Cl.$^6$ .................................................. G06F 13/14
[52] U.S. Cl. .......................... 710/13; 455/410; 455/422; 455/411
[58] Field of Search ........................ 340/825.34, 825.31; 364/478.13; 379/433, 67.1, 198; 455/558, 410, 411, 550, 422; 463/29; 380/23; 235/380

[56] References Cited

U.S. PATENT DOCUMENTS

| 4,343,990 | 8/1982 | Ueda | 219/492 |
| 5,034,597 | 7/1991 | Atsumi et al. | 235/380 |
| 5,162,989 | 11/1992 | Matsuda | 364/401 |
| 5,204,663 | 4/1993 | Lee | 340/825.34 |
| 5,261,070 | 11/1993 | Ohta | 395/188.01 |
| 5,266,782 | 11/1993 | Alanara et al. | 235/380 |
| 5,351,287 | 9/1994 | Bhattacharyya et al. | 379/95 |
| 5,365,580 | 11/1994 | Morisaki | 379/189 |
| 5,384,834 | 1/1995 | Sato et al. | 379/88 |
| 5,410,690 | 4/1995 | Kawata | 395/600 |
| 5,423,068 | 6/1995 | Hecker | 455/56.1 |
| 5,444,764 | 8/1995 | Galecki | 455/411 |
| 5,461,662 | 10/1995 | Hanai | 379/9 |
| 5,471,643 | 11/1995 | Marui | 455/33.1 |
| 5,557,665 | 9/1996 | Yamamoto | 379/198 |
| 5,742,910 | 4/1998 | Gallant et al. | 455/550 |

FOREIGN PATENT DOCUMENTS 2 241 133A  8/1991  United Kingdom.

*Primary Examiner*—Thomas C. Lee
*Assistant Examiner*—Chien Yuan
*Attorney, Agent, or Firm*—Frishauf, Holtz, Goodman, Langer & Chick, P.C.

[57] ABSTRACT

This invention relates to a radio communication terminal having a detachable memory for storing private information and, more particularly, to a terminal designed to manage the private information stored in a memory in the terminal by using a detachable memory. The identification number of the detachable memory mounted in the radio communication terminal in the previous operation is stored in the terminal. In using the radio communication terminal the next time, if the identification number of the detachable memory mounted in the terminal does not coincide with the previous identification number, the private information stored in the memory in the terminal is cleared. In addition, the identification number of a permitted detachable memory is stored in the memory in the terminal to inhibit the use of a memory having an identification number other than the above identification number. When the detachable memory is detached from the terminal, the private information is transferred to the detachable memory, and the memory in the terminal is cleared. By notifying the contents of the detachable memory at a predetermined timing, recognition of the detachable memory is facilitated to reduce operation errors.

23 Claims, 14 Drawing Sheets

03-3123-4567

TARO YAMADA

SPEECH COMMUNICATION
SERVICE IS AVAILABLE

FIG.9A

SPEECH COMMUNICATION
SERVICE IS NOT AVAILABLE

FIG.9B

| PUBLIC | PRIVATE | MEMORY |

FIG.14

| DATA NUMBER | NAME | TELEPHONE NUMBER | SERVICE |
|---|---|---|---|
| 01 | TARO YAMADA | 03-3123-4567 | SPEECH COMMUNICATION |
| 02 | ICHIRO TANAKA | 03-3123-8910 | SPEECH COMMUNICATION, VOICE MAIL |
| 03 | JIRO SUZUKI | 03-3456-7890 | SPEECH COMMUNICATION |
| 04 | SABURO KIMURA | 03-3456-2345 | SPEECH COMMUNICATION, VOICE MAIL |

FIG.11

COMMUNICATION APPARATUS CONTAINING PLURALITY OF IDENTIFICATION CODES AND OPERABLE FOR SPECIFIC USER BASED ON IDENTIFICATION CODE AND PRIVATE INFORMATION STORED IN DETACHABLE RECORDING MEDIUM

This application is a Continuation of application Ser. No. 08/506,831, filed Jul. 25, 1995, now abandoned.

BACKGROUND OF THE INVENTION

1. Field of the Invention

The present invention relates to a radio communication apparatus and, more particularly, to a radio communication apparatus having a detachable recording medium for storing private information.

2. Description of the Related Art

Portable telephone sets, portable data terminals, and the like are currently available as radio communication apparatuses. These radio communication apparatuses are connected to communication networks via private or public base stations to communicate with remote radio communication apparatuses. Some of these radio communication apparatuses have detachable memories in which private information is stored. Information to be stored in such a detachable memory includes various types of private information, e.g., an identification code for authentication with a base station or a network management center required for communication, and a remote subscriber number as private management data. When this detachable memory is mounted in the radio communication apparatus, the apparatus serves as a private terminal.

Such a radio communication apparatus, however, is designed for private use. Let it be assumed that this terminal is used by a plurality of users. In this case, if a given user uses the terminal after storing the private management data in the detachable memory in the terminal's memory, the data is left in the terminal, and the next user may access the private management data.

In addition, as the terminal is used by a plurality of users, the contents of data registered in the terminal or the detachable memory cannot be specified eventually. For this reason, every time a user checks the contents of data registered in the terminal or the detachable memory, the user must set a mode for reading out the contents.

SUMMARY OF THE INVENTION

In order to solve the above problems, it is an object of the present invention to provide a radio communication apparatus which allows a plurality of users to use a terminal without being aware of management of the user memory and to check the contents of registered data without requiring a cumbersome operation.

According to an aspect of the present invention, there is provided a radio communication apparatus which can be used by a plurality of users as an apparatus for the private use of each user, comprising: input means for inputting information unique to each user; control means for causing the radio communication apparatus to serve as an apparatus for the private use of each user on the basis of the information input by the input means; and notification means for notifying that the radio communication apparatus is operating on the basis of information unique to a specific user.

According to another aspect of the present invention, there is provided a radio communication apparatus which can be used by a plurality of users as an apparatus for the private use of each user, comprising: input means for inputting information unique to each user; control means for causing the radio communication apparatus to serve as an apparatus for the private use of each user on the basis of the information input by the input means; a memory for storing user information; and means for inhibiting a third party from using the information stored in the memory.

According to still another aspect of the present invention, there is provided a radio communication apparatus which can be used by a plurality of users as an apparatus for the private use of each user, comprising: housing means for temporarily housing a detachable storage medium in which information unique to a user is stored; storage means for storing information for identifying a usable detachable storage medium; first discrimination means for discriminating, on the basis of the information stored in the storage means, whether the detachable storage medium housed in the housing means can be used; read means for reading out the information unique to the user from the detachable storage medium housed in the housing means when the first discrimination means discriminates that the detachable storage medium can be used; and control means for causing the radio communication apparatus to serve as an apparatus for the private use of each user on the basis of the information unique to the user which is read out by the read means.

According to further aspect of the present invention, there is provided a radio communication apparatus which can be used by a plurality of users as an apparatus for the private use of each user, comprising: fixed memory means which is fixed in an apparatus body and in which information unique to a user of the apparatus body is stored; housing means for temporarily housing a detachable storage medium in which information unique to a user is stored; selection means for selecting whether to use the information unique to the user which is stored in the fixed memory means or the information unique to the user which is stored in the detachable storage medium; read means for reading out the information unique to the user which is selected by the selection means; and control means for causing the radio communication apparatus to serve as an apparatus for the private use of each user on the basis of the information unique to the user which is read out by the read means.

With the above arrangement, the above objects' can be achieved. That is, in the present invention, a user memory in a terminal is managed by the ID of the main body or the ID of a detachable memory. In addition, when the detachable memory is to be detached from the main body, the contents of the user memory in the terminal are stored in the detachable memory. Furthermore, when the power switch is turned on or a predetermined key is operated, at least part of private management data in the main body or the detachable memory is displayed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 9A and 9B are views showing display samples in the first embodiment of the present invention;

FIG. 11 is a view showing a table structure for explaining the first modification of the first embodiment of the present invention;

FIG. 14 is a display sample in the second modification of the first embodiment of the present invention.

DETAILED DESCRIPTION OF THE PREFERRED EMBODIMENTS

In the following embodiment, the present invention is applied to a PHS (Personal Handy phone System) planned to be put into practice in Japan. However, the present invention is not limited to this.

This embodiment will be described below with reference to the accompanying drawings.

A. System Configuration

Figure 1:
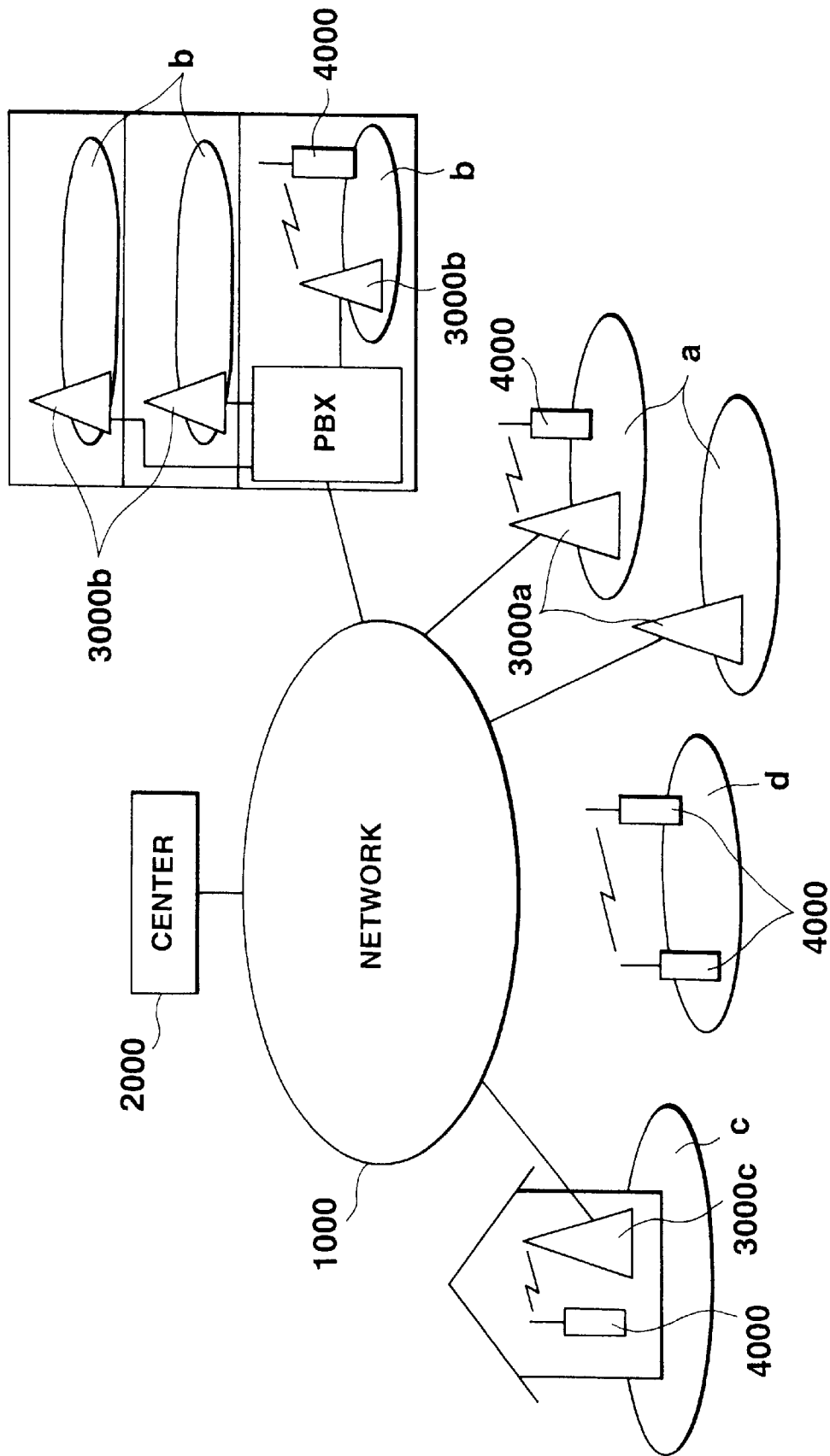
FIG. 1 is a view for explaining the configuration of a communication system to which the present invention is applied.

FIG. 1 is a view for explaining the system configuration of a PHS. Referring to FIG. 1, a network 1000 is an existing communication network, which is constituted by, e.g., a PSTN, an ISDN, a portable telephone network, and the like. A center 2000 performs overall system management, e.g., connection switching control of these communication networks, connection switching control between communication networks, and connection switching control of a PHS.

Base stations 3000a to 3000c are connected to the network 1000. The base station 3000a is a base station installed public space. The base station 3000a can be connected to a PHS terminal 4000 in a communication area a. The base station 3000b is a base station installed in an office and connected to the network 1000 via a PBX (Private Branch Exchange). The base station 3000b can be connected to the PHS terminal 4000 in a communication area b. The base station 3000c is a base station installed in a home. The base station 3000c can be connected to the PHS terminal 4000 in a communication area c. The PHS terminal 4000 can be used in all the communication areas a, b, and c.

Assume that two PHS terminals 4000 are located close, and the communication areas of the terminals overlap as indicated by a communication area d. In this case, the two terminals can perform direct communication (to be referred to as inter-terminal direct communication hereinafter) without the mediacy of any base station. Note, however, that this inter-terminal direct communication can be performed only when the two terminals belong to the same base station (in the home or the office), i.e., only when the two terminals have identical base station identification information.

Note that different identification codes are used for the PHS terminal 4000 in the home, the office, and the public. In addition, an identification code used in inter-terminal direct communication is part of the base station identification code of the PHS terminal 4000.

B. PHS Terminal Configuration

Figure 2:
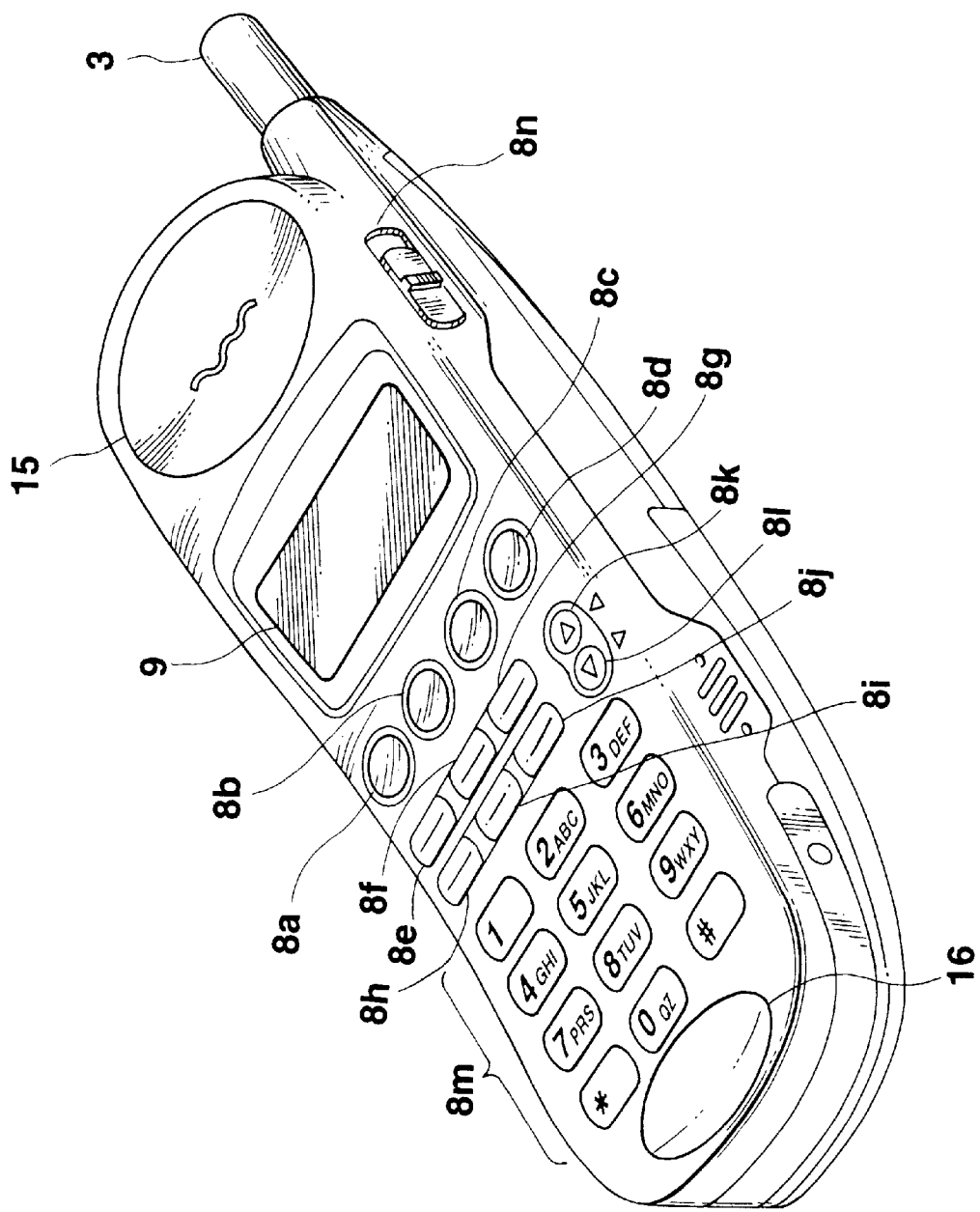
FIG. 2 is a perspective view of a terminal used in the communication system.
Figure 3:
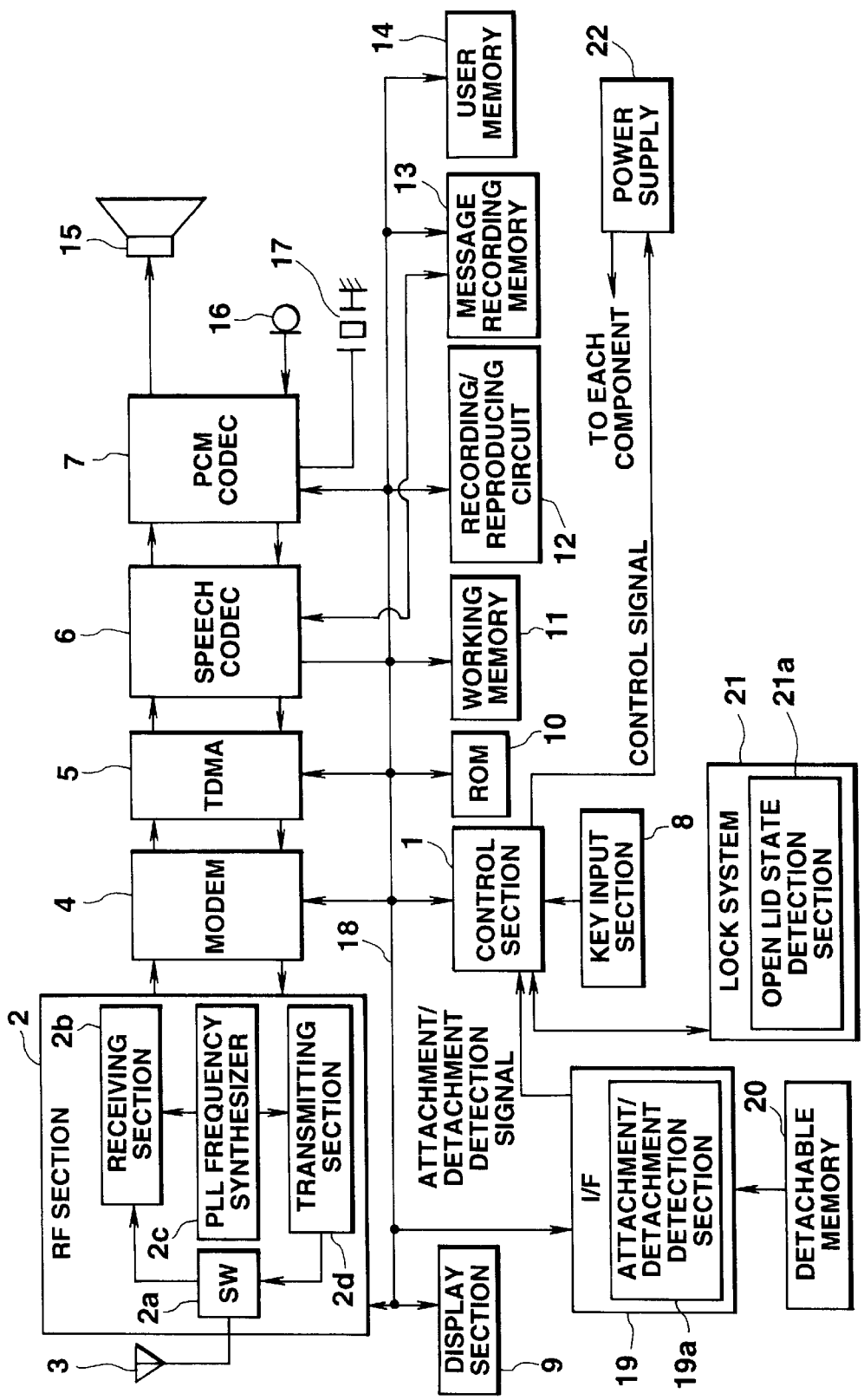
FIG. 3 is a block diagram of the terminal used in the communication system.

FIG. 2 is a perspective view showing a PHS terminal of type A. FIG. 3 is a block diagram showing the PHS terminal.

Referring to FIG. 3, reference numeral 1 denotes a control section to which an RF section 2, a modem 4, a TDMA (Time Division Multiple Access) processing section 5, a speech CODEC 6, a PCM CODEC 7, a display section 9, a ROM 10, a working memory 11, a recording/reproducing circuit 12, and a message recording memory 13, a user memory 14, and an interface 19 are connected to via a bus 18.

The control section 1 controls the overall operation of the terminal in accordance with control programs stored in the ROM 10. More specifically, the control section 1 executes data management processing in the main body and memory content display processing as well as general communication processing such as originating/terminating processing.

In this data management processing, the contents of a memory (the working memory 11 or the user memory 14) in the main body are cleared or transferred depending on the state of a detachable memory 20 (to be described later).

In memory content display processing, the contents of the ROM 10, the user memory 14, and the detachable memory 20 are displayed.

A key input section 8 is connected to the control section 1. As shown in FIG. 2, in addition to an identification code setting key 8d for manually setting an identification code in an originating operation and a ten-key pad 8m for inputting a remote subscriber number and the like, the key input section 8 has an origination key 8a for designating originating of a remote subscriber number or the like, an end key 8b for disconnecting a channel, a transceiver key 8c for designating inter-terminal direct communicating or extension communication, a telephone directory key 8e for designating a mode for searching a telephone directory database stored in the detachable memory 20, a telephone answering function key 8f for setting the telephone answering function, a redial key 8g for redialing a previously dialed number with one touch, a registration key 8h for designating registration of data in each mode, a delete key 8i for designating deletion of data in each mode, a selection key 8j to be selected when a service provided by a communication service company is to be designated, scroll keys 8k and 8l for designating volume control and scrolling of a display screen, and a power switch 8n for turning on/off the power supply of the terminal.

The RF section 2 performs frequency conversion processing, and has an antenna switch 2a, a receiving section 2b, a PLL frequency synthesizer 2c, and a transmitting section 2d. The antenna switch 2a is connected to an antenna 3. The antenna switch 2a selects the receiving section 2b or the transmitting section 2d to distribute a signal to the receiving section 2b or the transmitting section 2d at a transmission/reception timing.

The receiving section 2b frequency-converts a signal input from the antenna 3 via the antenna switch 2a into a reception IF signal by using two mixers (not shown). The transmitting section 2d frequency-converts a modulated wave of a $\pi/4$ shift QPSK (Quadrature Phase Shift Keying) scheme, input from the modem 4, by using a mixer (not shown), and radiates the resultant signal from the antenna 3 via the antenna switch 2a. The PLL frequency synthesizer 2c outputs a local oscillation signal for frequency conversion in the receiving section 2b and the transmitting section 2d.

The receiving section 2b or the transmitting section 2d of the RF section 2 is connected to the modem 4. The modem 4 performs modulation/demodulation processing of the $\pi/4$ shift QPSK scheme.

In the reception mode, the modem 4 demodulates a reception IF signal from the receiving section 2b of the RF section 2. With this operation, the reception IF signal is separated into in-phase component data and a quadrature component data to be transferred, as a data string, to the TDMA processing section 5.

In the transmission mode, the modem 4 forms in-phase component data and quadrature component data from a data string transferred from the TDMA processing section 5, performs modulation of the $\pi/4$ shift QPSK scheme, and outputs the resultant data to the transmitting section 2d of the RF section 2.

The TDMA processing section 5 is connected to the modem 4. The TDMA processing section 5 performs frame synchronization and slot format processing.

In the reception mode, the TDMA processing section extracts one-slot data from a data string (frame) sent from the modem 4 at a predetermined timing. The TDMA processing section 5 extracts a unique word (sync signal) from this data to establish frame synchronization. In addition, the TDMA processing section 5 descrambles control and speech data portions. Thereafter, the TDMA processing section 5 respectively transfers the control data and the speech data to the control section 1 and the speech CODEC 6.

In the transmission mode, the TDMA processing section 5 adds control data and the like transferred from the control section 1 to speech data transferred from the speech CODEC 6 and scrambles the resultant data. Subsequently, the TDMA processing section 5 adds a unique word and the like to the data to form one-slot transmission data, inserts the data in a predetermined slot in a frame at a predetermined timing, and outputs the resultant data to the modem 4.

The speech CODEC 6 is connected to the TDMA processing section 5. The speech CODEC 6 codes/decodes digital data.

In the reception mode, the speech CODEC 6 decodes an ADPCM speech signal sent from the TDMA processing section 5 into a PCM speech signal, and outputs it to the PCM CODEC 7.

In the transmission mode, the speech CODEC 6 codes a PCM speech signal sent from the PCM CODEC 7 into an ADPCM speech signal, and outputs it to the TDMA processing section 5.

The PCM CODEC 7 and the message recording memory 13 (to be described later) are connected to the speech CODEC 6. The PCM CODEC 7 performs analog/digital conversion processing for a speech signal.

In the reception mode, a PCM speech signal sent from the speech CODEC 6 is D/A-converted, and the resultant analog signal is amplified to drive a loudspeaker 15.

In the transmission mode, an analog speech signal input from a microphone 16 is amplified and then A/D-converted, and the resultant PCM speech signal is output to the speech CODEC 6. In addition, the PCM CODEC 7 controls the volume of the loudspeaker 15 by controlling the amplification factor of a speech signal output thereto, outputs a signal to a ringer 17 for notifying reception of an incoming call, and generates/decodes a DTMF (Dual Tone Multifrequency) signal.

The display section 9 displays input data for various control operations and the resultant data.

Figure 4:
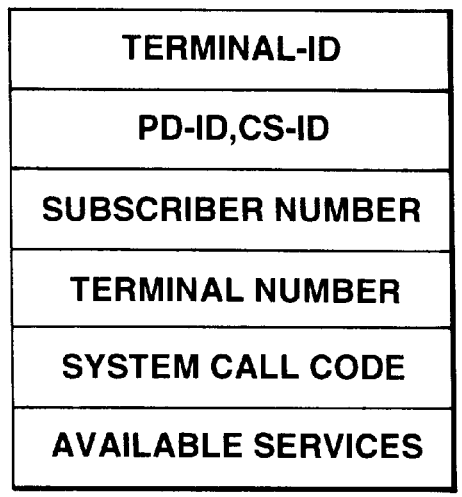
FIG. 4 is a view showing part of the data structure of a ROM in the main body.

The ROM 10 is used to store control programs for operation control performed by the control section 1, and an identification code including the identification code (TERMINAL-ID) of the main body, the identification code (PS-ID) of the terminal, the identification code (CS-ID) of a private base station, "SUBSCRIBER NUMBER" (also called a telephone number), "TERMINAL NUMBER" of the remote or home terminal which is used for extension communication or inter-terminal direct communication, "SYSTEM CALL CODE" (part of the CS-ID) used for inter-terminal direct communication, information indicating available services (e.g., a speech communication service, a voice mail service, and the like), and the like, as shown in FIG. 4.

The working memory 11 is used to temporarily store data used for control performed by the control section 1, and store various conditions set by the key input section 8.

The message recording memory 13 is used when the telephone answering function is activated. The message recording memory 13 is used to record messages recorded by the user and incoming messages. The recording/reproducing circuit 12 controls recording/reproduction of messages in/from the message recording memory 13 under the control of the control section 1.

Figure 5:
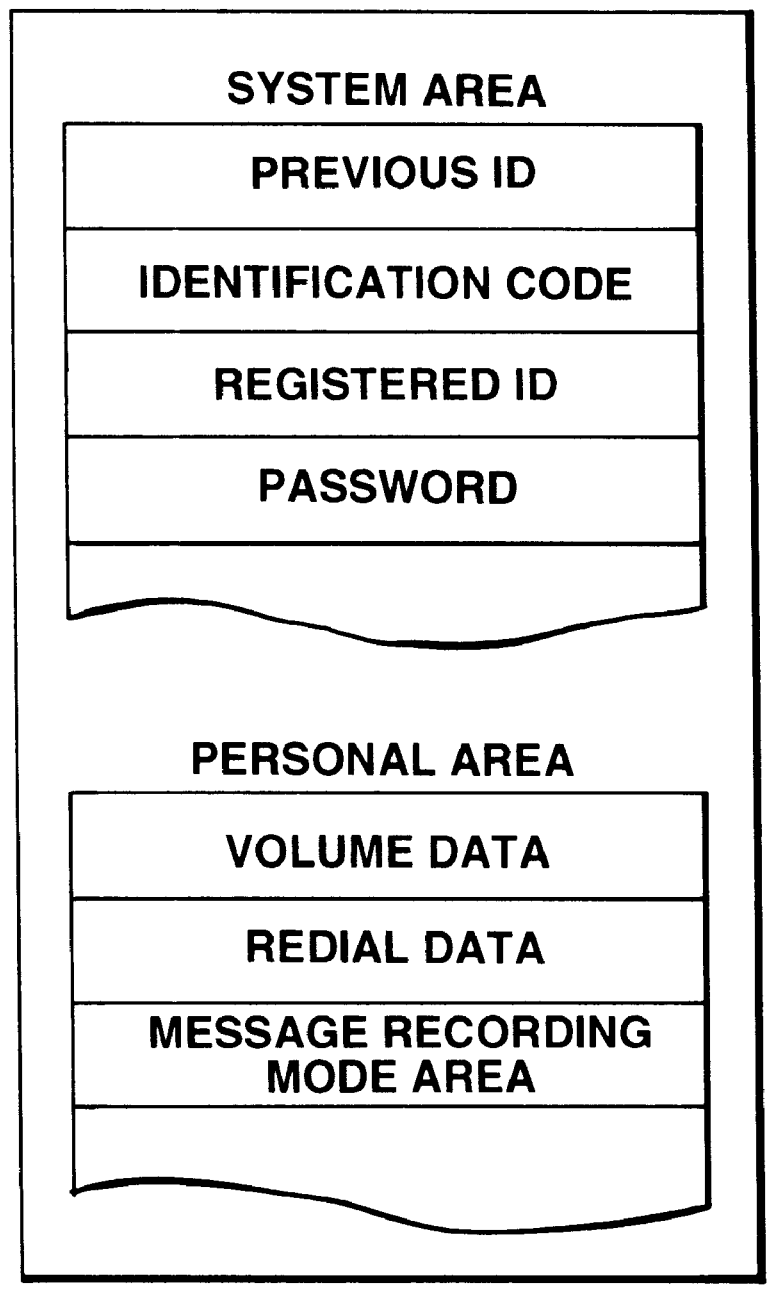
FIG. 5 is a view showing part of the data structure of a user memory in the main body.

The user memory 14 is a memory constituted by an EEPROM and the like and used to store user data. As shown in FIG. 5, the user memory 14 is divided into a system area and a personal area. The system area is used to store the previous ID to be used for identifying the previous user, an identification code read out from the detachable memory 20, a registered ID for identifying a detachable memory which is allowed to be used in the terminal, a password, and the like. The personal area is used to store private data, e.g., volume data, redial data, message recording mode data for setting conditions set for the message recording mode, and the like.

Figure 6:
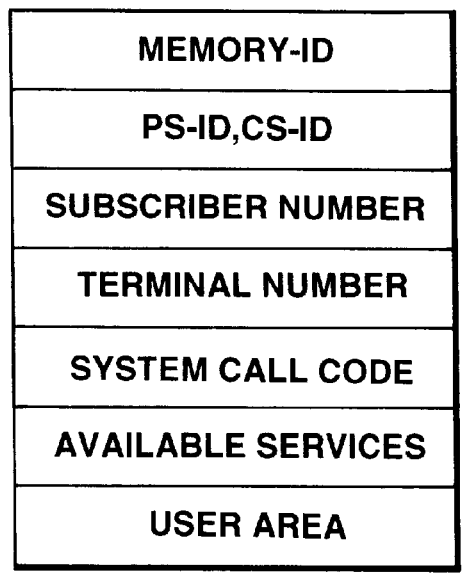
FIG. 6 is a view showing the data structure of a detachable memory.

The interface 19 is connected to the bus 18 to exchange data with the detachable memory 20. In addition, the interface 19 detects the mounted state of the detachable memory 20 through an attachment/detachment detection section 19a and outputs an attachment/detachment detection signal to the control section 1. As shown in FIG. 6, the contents of data stored in the storage portion of the detachable memory 20 are: the identification code (MEMORY-ID) of the detachable memory, the identification code (PS-ID) of the terminal, the identification code (CS-ID) of a private base station, a subscriber number, a terminal number, a system call code, the types of available services, and the like. This detachable memory 20 also has a user area for storing private data about the user, e.g., the name of the user, a telephone directory database, and the functions of setting the terminal and the like.

A lock system 21 locks/unlocks the ID memory in accordance with a control signal from the control section 1, and outputs a detection signal from an open lid state detection section 21a to the control section 1.

A power supply section 22 supplies power to each terminal component in accordance with a control signal from the control section 1.

Figure 7A:
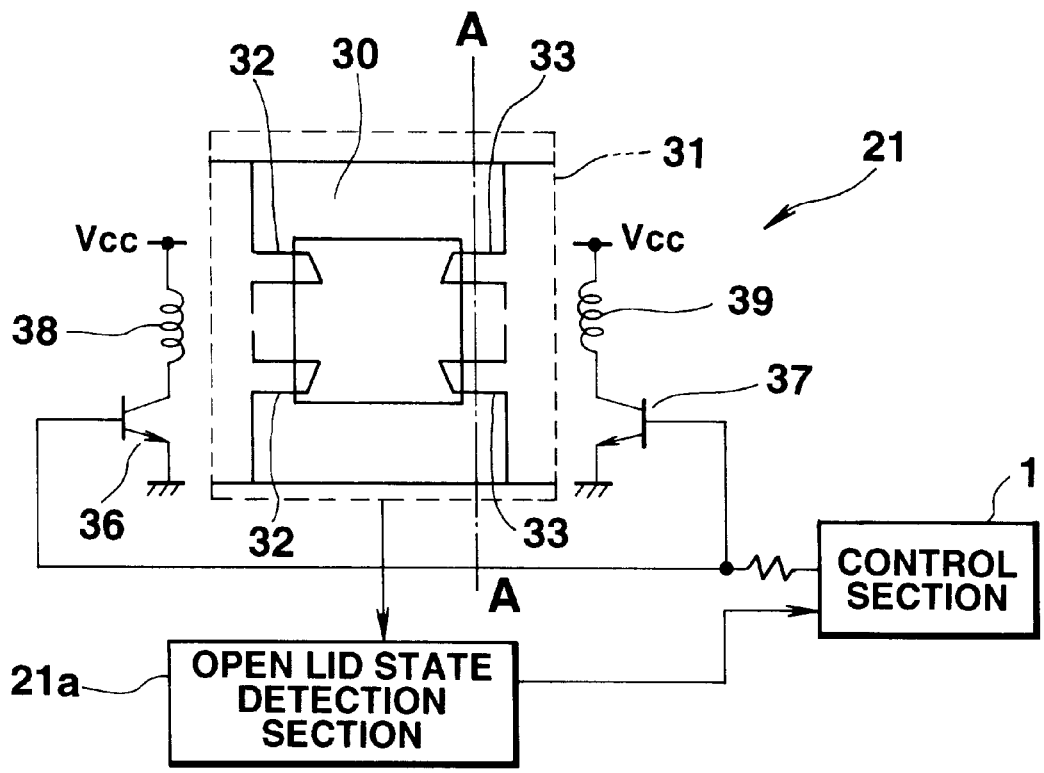
FIGS. 7A to 7C are views showing the arrangement of a detachable memory housing portion.
Figure 7B:
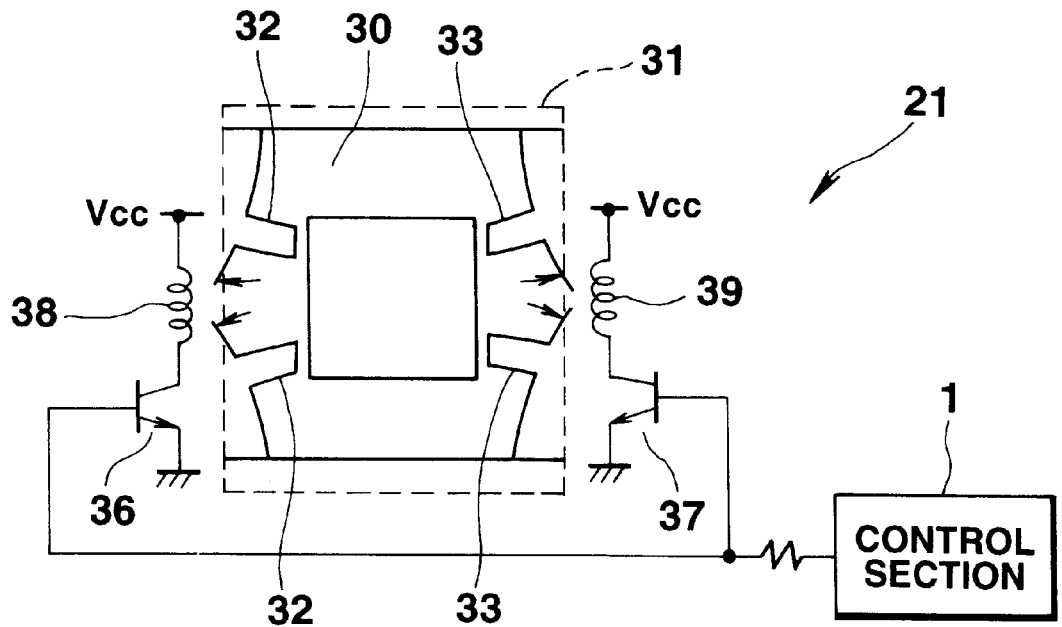
Figure 7C:
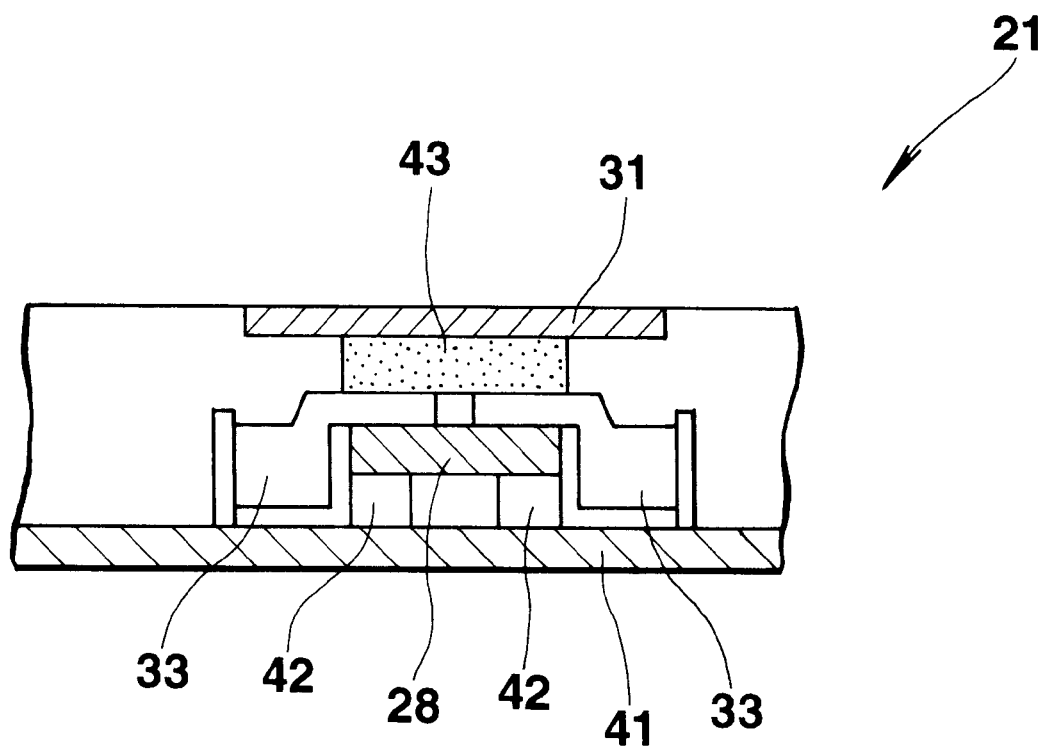

FIGS. 7A to 7C show the lock system 21. FIG. 7A shows the locked state of the detachable memory 20. FIG. 7B shows the unlocked state of the detachable memory 20. FIG. 7C is a sectional view taken along a chain line I—I in FIG. 7A.

The housing portion of the detachable memory 20 is formed in the lower surface of the terminal (not shown). The rectangular detachable memory 20 is housed in a memory housing portion 30, and a lid 31 is placed thereon from above. In the memory housing portion 30, while the detachable memory 20 set at a predetermined position, two pairs of support pawl portions 32 and 33 are arranged to oppose the two side edges of the detachable memory 20. These pairs of support pawl portions 32 and 33 are constituted by spring members. While the lid 31 is kept closed with a cushion 43 being sandwiched between the lid 31 and the pawl portions 32 and 33, the detachable memory 20 is fixed with its two side edges being clamped by the pawl portions 32 and 33 with their biasing forces. While the lid is open, an output from the open lid state detection section 21a for detecting the open state of the lid 31 is supplied to the control section 1. The detachable memory 20 is connected to the interface 19 via an electrical contact 42 between a substrate 41 and the detachable memory 20, and data read/write access to the detachable memory 20 is controlled by the control section 1.

In an unlocked state of the detachable memory 20, when a control signal is supplied from the control section 1, transistors 36 and 37 are turned on to bias electromagnets 38 and 39, thereby deforming the support pawl portions 32 and 33 against the spring forces, as shown in FIG. 7B. As a result, the two side edges of the detachable memory 20 are unlocked.

C. Operation in Terminal Communication

With the above arrangement, when the power switch is turned on, a search is made for a control carrier (a wave having a predetermined frequency) from a base station to set a control channel which can be currently accessed.

More specifically, this control carrier is received through the antenna 3 and frequency-converted into an IF signal by the receiving section 2b of the RF section 2. This reception IF signal is subjected to $\pi/4$ shift QPSK demodulation processing in the modem 4 to be converted into a data string. This data string undergoes synchronization processing in the TDMA processing section 5, and the resultant control data is transferred to the control section 1. The control section 1 executes originating or terminating processing on the basis of this control data.

When communication is to be performed, assignment of a communication channel is requested with respect to a base station by using the above control channel. With this operation, a communication path for the base station is connected by using an assigned communication channel in accordance with a predetermined procedure. A remote subscriber number is input via the base station, and communication is started when the remote terminal responds.

In the reception mode, a wave received through the antenna 3 is frequency-converted into an IF signal by the receiving section 2b. This reception IF signal is demodulated by the modem 4 to be converted into a data string. After the data is descrambled by the TDMA processing section 5, the control data is transferred to the control section 1, and the speech data (ADPCM signal) is transferred to the speech CODEC 6. This speech data is decoded by the speech CODEC 6 to be converted into a PCM signal. This PCM signal is digital/analog-converted by the PCM CODEC 7, and the resultant data is amplified. The amplified data is supplied to the loudspeaker 15 to generate a sound.

In the transmission mode, a speech signal from the microphone 16 is A/D-converted and then amplified by the PCM CODEC 7 and coded into an ADPCM code by the speech CODEC 6. This coded speech data is subjected to scrambling or the like in the TDMA processing section 5. The resultant data is inserted in a slot at a predetermined timing. The modem 4 performs $\pi/4$ shift QPSK modulation processing for the data. The transmitting section 2d frequency-converts the data into a signal in a 1.9-GHz band. The signal is then radiated from the antenna 3.

D. Operation

The operation of the present invention will be described with reference to the flow chart of FIG. 8, which shows the operation of the first embodiment of the present invention. In this embodiment, TERMINAL-ID of the previously used terminal or MEMORY-ID of the detachable memory is stored in the user memory 14, and the personal area as the user data area of the user memory 14 is cleared if TERMINAL-ID or MEMORY-ID stored in the user memory 14 does not coincide with TERMINAL-ID of the currently used terminal or MEMORY-ID of the detachable memory. In addition, the use of a detachable memory having MEMORY-ID other than MEMORY-ID registered in the user memory 14 in advance is inhibited. Furthermore, private information such as identification numbers stored in the detachable memory or the ROM 10 can be displayed when the power switch is turned on.

Figure 8:
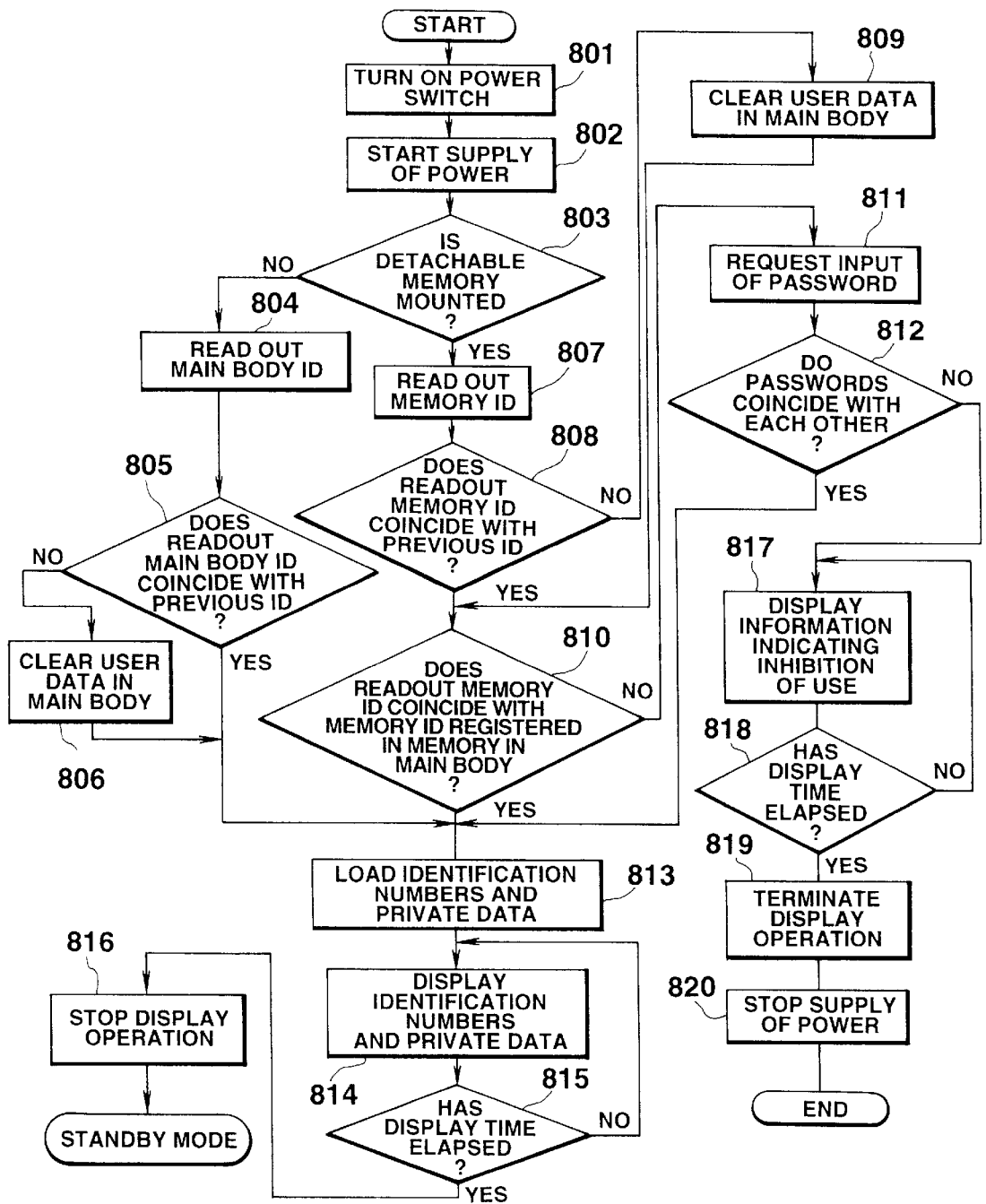
FIG. 8 is a flow chart for explaining the operation of the first embodiment of the present invention.

As shown in FIG. 8, a user turns on the power switch to use the terminal (step 801). A control signal is then output from the control section 1 to the power supply section 22, and power is supplied from the power supply section 22 to each component (step 802). It is then checked on the basis of a detection signal from the attachment/detachment detection section 19a whether the detachable memory 20 is mounted in the terminal (step 803). If it is determined that the detachable memory 20 is not mounted, TERMINAL-ID is read out from the ROM 10 (step 804). This TERMINAL-ID is compared with the previous ID stored in the user memory 14 (step 805). If this comparison result indicates coincidence, the use of the terminal is permitted immediately. If the comparison result indicates incoincidence, the personal area of the user memory 14 is cleared (step 806), and the use of the terminal is permitted.

If it is determined in step 803 that the detachable memory 20 is mounted, MEMORY-ID of the detachable memory 20 is loaded (step 807). It is checked whether this MEMORY-ID coincides with the previous ID stored in the user memory 14 (step 808). If it is determined that they do not coincide with each other, the contents of the personal area of the user memory 14 are cleared (step 809). If it is determined in step 808 that MEMORY-ID coincides with the previous ID, it is checked whether MEMORY-ID of the permitted detachable memory which is stored in the registered ID area of the user memory 14 coincides with MEMORY-ID loaded in step 807 (step 810). If it is determined that they coincide with each other, the use of the terminal is permitted. If it is determined in step 809 that they do not coincide with each other, the input of a password is requested (step 811). If the password input through the key input section 8 coincides with the password stored in the user memory 14 (step 812), the use of the terminal is permitted.

As described above, when the use of the terminal is permitted, identification numbers (e.g., subscriber numbers), available services (e.g., a speech communication service), private data (e.g., names), and the like are read out from a corresponding memory (the ROM 10 or the detachable memory 20) (step 813). The identification numbers, the available services, the private data, and the like are displayed on the display section 9 for a predetermined period of time (e.g., 10 sec), as shown in FIG. 9A (steps 814 and 815). When the predetermined period of time has elapsed, the display operation is stopped (step 816), and a standby mode is set.

If it is determined in step 812 that the two passwords do not coincide with each other, it indicates that the use of the terminal in which the detachable memory 20 is currently mounted is not permitted, and use of the terminal by the owner of the current detachable memory is not permitted by the owner of the terminal to use. For this reason, information indicating that the use of the terminal is inhibited is displayed on the display section 9 for a predetermined period of time (steps 817 and 818). When the predetermined period of time has elapsed, the control section 1 outputs a control signal to the power supply section 22 to stop the supply of power to each component (step 820).

In the above embodiment, the identification numbers, the available services, the private data, and the like are displayed when the power switch is turned on. However, these data may be displayed when the originating key 8a or the like is operated.

Figure 10:
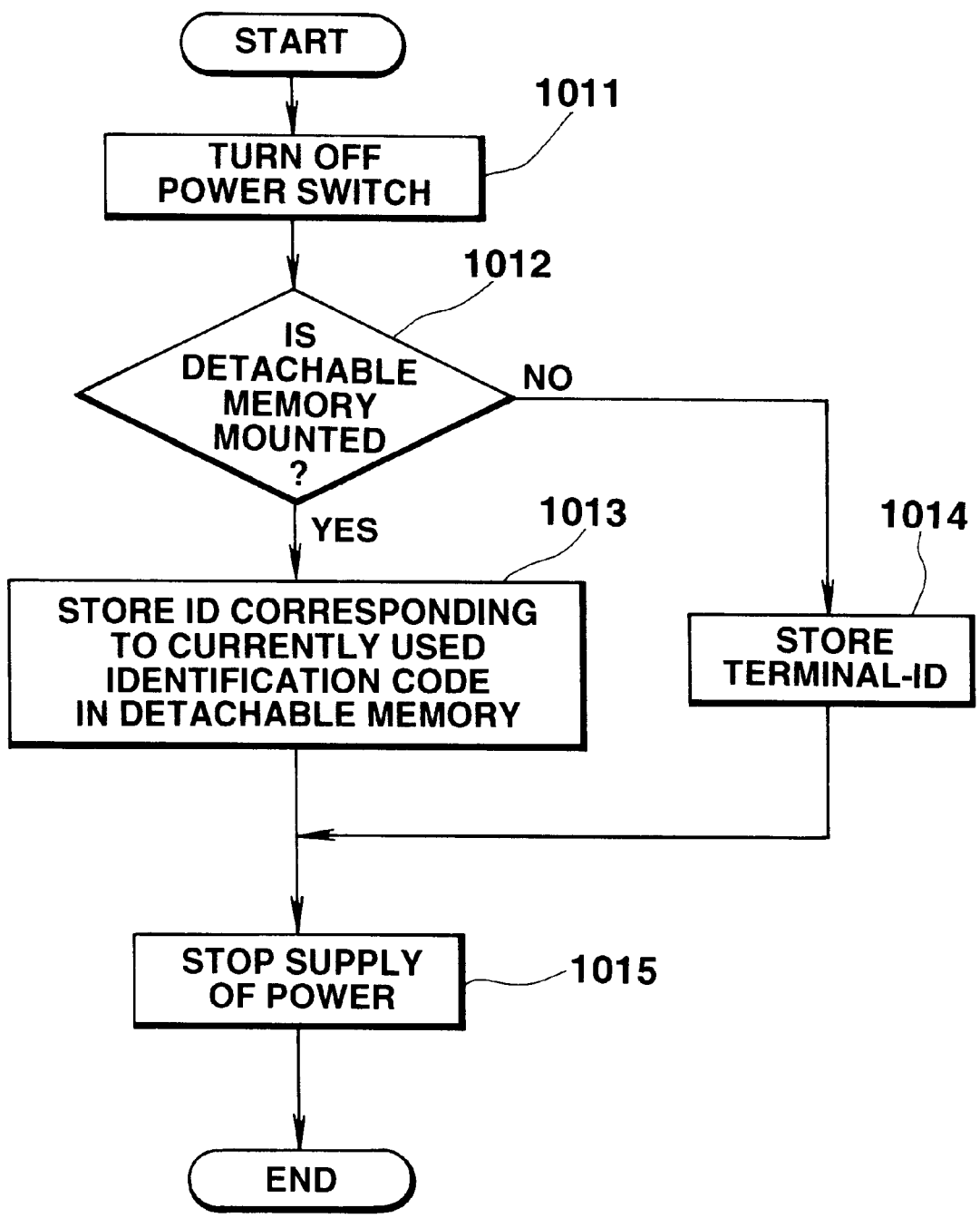
FIG. 10 is a flow chart for explaining the operation of the first embodiment of the present invention.

A method of storing the previous ID will be described next with reference to FIG. 10. In this case, the previous ID is stored when the power switch 8n is turned off. Referring to FIG. 10, the use of the terminal is ended, and the power switch 8n is turned off (step 1011). It is then checked whether the detachable memory 20 is mounted (step 1012). If it is determined that the detachable memory 20 is mounted, the ID in the memory in which the currently used identification number is stored (TERMINAL-ID in the ROM 10 or MEMORY-ID in the detachable memory 20) is stored in the previous ID area of the user memory 14 (step 1013). If it is determined that the detachable memory 20 is not mounted, TERMINAL-ID in the ROM 10 is stored in the previous ID area of the user memory 14 (step 1014). The supply of power from the power supply section 22 to each component is stopped in accordance with a control signal from the control section 1 (step 1015). In the case shown in FIG. 10, the previous ID is stored when the power switch 8n is turned off. However, the present invention is not limited to this operation, and the previous ID may be stored when another key operation is performed, e.g., when the end of communication is designated with the end key 8b.

Figure 12:
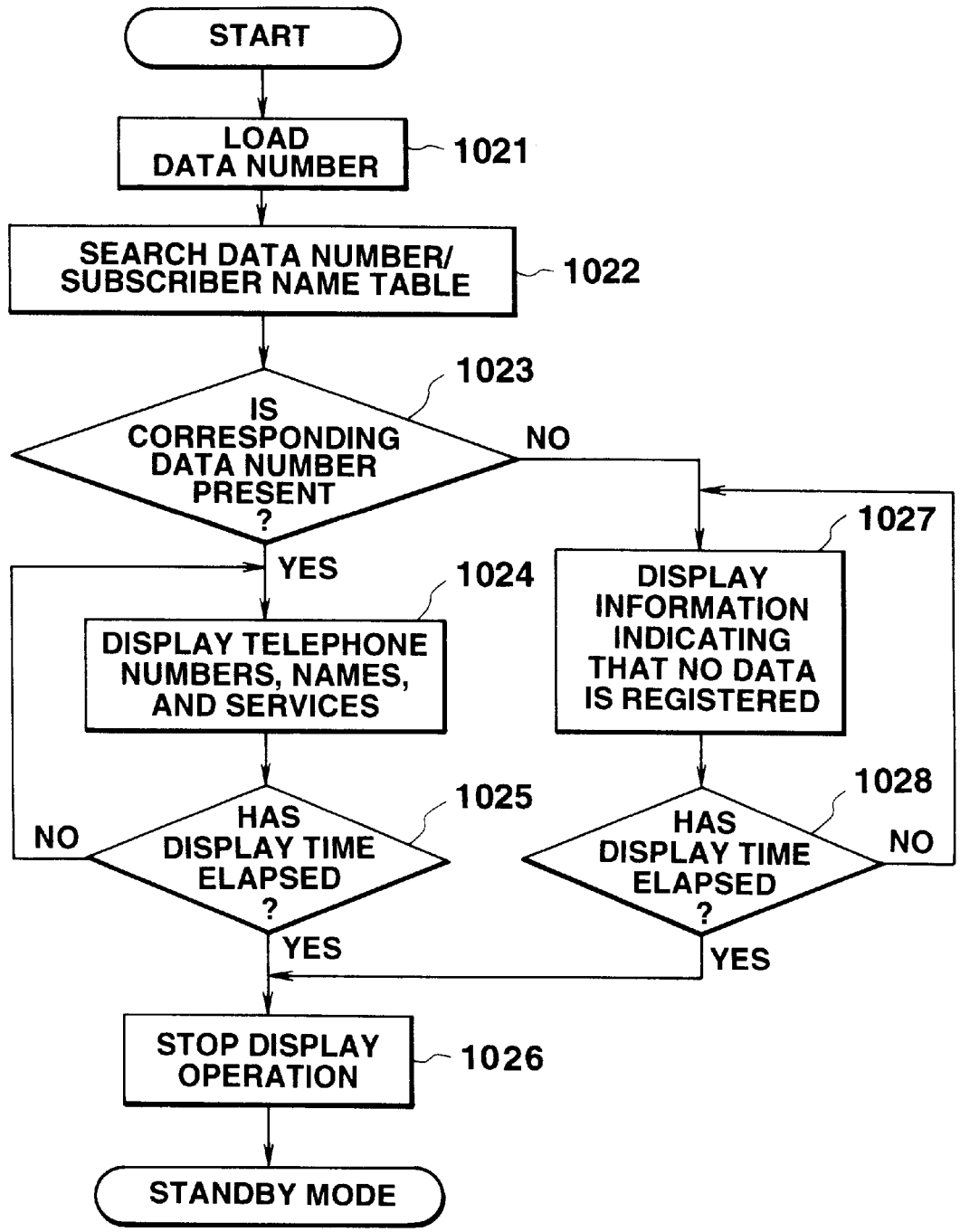
FIG. 12 is a flow chart for explaining the operation of the first modification of the first embodiment of the present invention.

In addition, in the above embodiment, the identification numbers, the available services, the private data, and the like stored in the ROM 10 or the detachable memory 20 are read out and displayed. However, the present invention is not limited to this. For example, only TERMINAL-ID or MEMORY-ID may be stored in the ROM 10 or the detachable memory 20, and identification numbers (telephone numbers), private information such as names, available services, and the like corresponding to TERMINAL-ID or MEMORY-ID are stored as a table in the user memory 14, as shown in FIG. 11. Identification information, available services, private data, and the like may be displayed on the basis of this table. More specifically, as shown in FIG. 12, when DATA NUMBER is loaded (step 1021), the table in the user memory 14 is searched with loaded DATA NUMBER as a key (step 1022) to check whether the corresponding DATA NUMBER is present (step 1023). If it is determined that the corresponding ID is present, the telephone numbers, the names, the available services, and the like are displayed on the display section 9 for a predetermined period of time as shown in FIG. 9A (steps 1024 and 1025). When the predetermined period of time has elapsed, the display operation is terminated (step 1026). In contrast to this, if it is determined in step 1023 that the corresponding ID is not present, information indicating that any telephone numbers, names, available services, and the like are not registered is displayed on the display section 9 for a predetermined period of time as shown in FIG. 9B (steps 1027 and 1028). When the predetermined period of time has elapsed, the display operation is terminated (step 1026).

If information indicating that an identification code whose use is set upon operation of the ten-key pad 8m is the identification code of the terminal body or the detachable memory is displayed, the identification code can be recognized more easily. Note that whether to use the identification code stored in the ROM 10 in the main body or the detachable memory 20 is set in advance by a key operation or the like.

Figure 13:
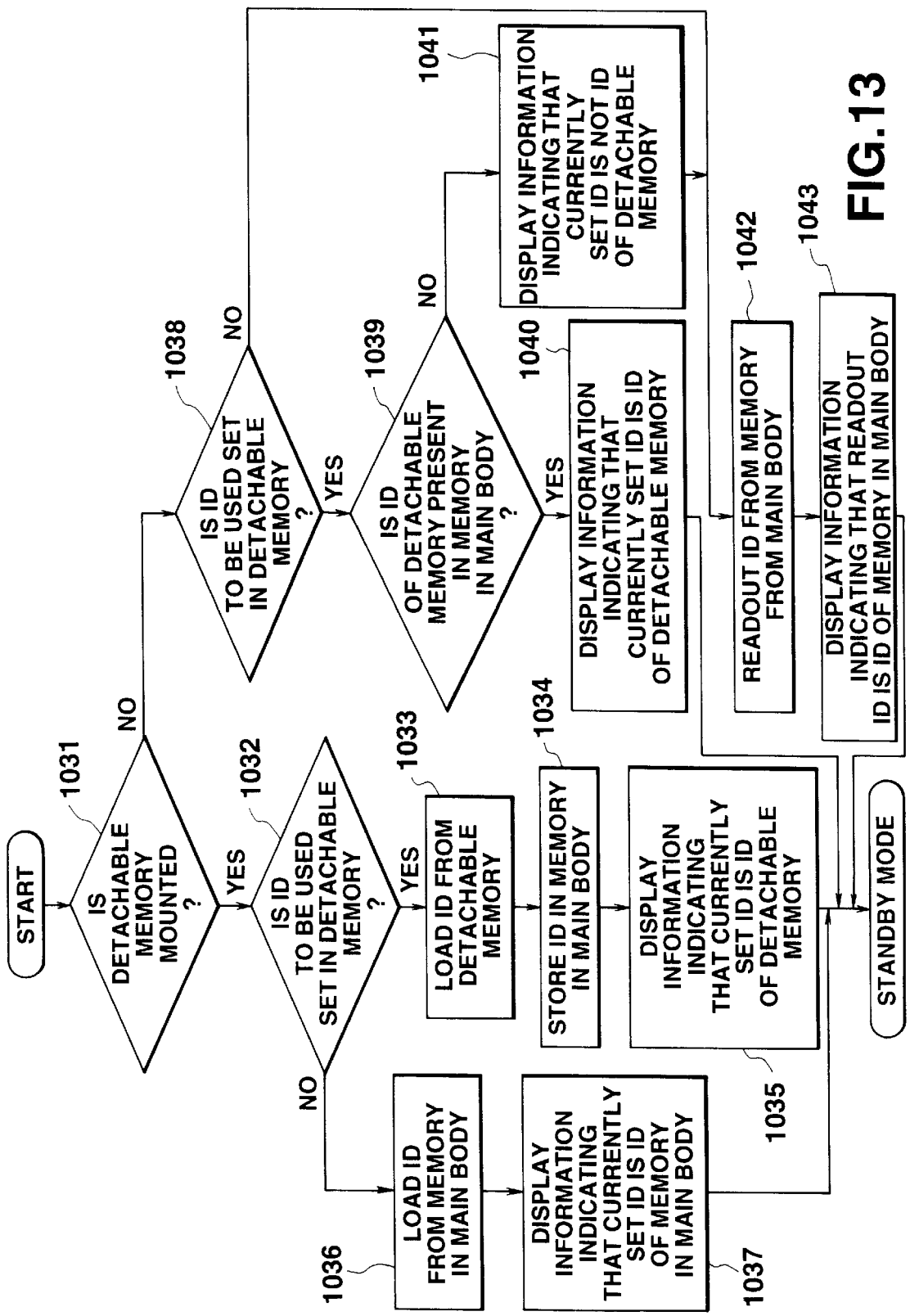
FIG. 13 is a flow chart for explaining the operation of the second modification of the first embodiment of the present invention.

More specifically, when the ten-key pad 8m is operated, it is checked on the basis of an attachment/detachment detection signal from the attachment/detachment detection section 19a whether the detachable memory 20 is currently mounted in the terminal, as shown in FIG. 13 (step 1031). If it is determined that the detachable memory 20 is mounted, it is checked whether an identification code to be used is set in the detachable memory 20 (step 1032). If it is determined that the identification code is set in the detachable memory 20, the identification code is read out from the detachable memory 20 and is stored in the user memory 14 (steps 1033 and 1034). Information indicating that the currently set identification code is the identification code of the detachable memory 20 is displayed on the display section 9 (step 1035). For example, as shown in FIG. 14, the mark "MEMORY" is turned on. If it is determined in step 1032 that the identification code is set in the ROM 10, the identification code is read out from the ROM 10 (step 1036), and information indicating that the currently set identification code is the identification code of the ROM 10 is displayed (step 1037). For example, as shown in FIG. 14, the mark "MEMORY" is turned off.

If it is determined in step 1031 that the detachable memory 20 is not mounted, it is checked whether the identification code to be used is set in the detachable memory 20 (step 1038). If it is determined that the identification code is set in the detachable memory 20, it is checked whether the identification code of the detachable memory 20 is stored in the user memory 14 (step 1039). If it is determined that the identification code of the detachable memory 20 is stored in the user memory 14 (step 1040), information indicating the presence of the identification code of the detachable memory 20 is displayed on the display section 9 (step 1040). For example, as shown in FIG. 14, the mark "MEMORY" is turned on. In contrast to this, if it is determined in step 1039 that the identification code of the detachable memory 20 is not stored in the user memory 14, information indicating the absence of the identification code of the detachable memory 20 is displayed (step 1041). For example, a message like "NO IDENTIFICATION CODE OF DETACHABLE MEMBER IS PRESENT" is displayed. The identification code is then read out from the ROM 10 in the main body (step 1042), and information indicating that the currently set identification code is the identification code of the ROM 10 is displayed (step 1043). For example, as shown in FIG. 14, the mark "MEMORY" is turned off. If it is determined in step 1038 that the identification code to be used is not set in the detachable memory 20 but is set in the ROM 10 in the main body, the identification code is read out from the ROM 10 in the main body (step 1042), and information indicating that the currently set identification code is the identification code of the ROM 10 is displayed (step 1043). For example, as shown in FIG. 14, the mark "MEMORY" is turned off.

In this case, the above display operation may be performed differently depending on whether an identification code to be read out is a public or private code. For example, if the identification code to be read out is a public code, i.e., a subscriber number, the mark "PUBLIC" is displayed, as shown in FIG. 14. For example, if the identification code to be read out is a private code, i.e., CS-ID, the mark "PRIVATE" is displayed, as shown in FIG. 14. With this operation, the set state of the identification code to be used can be recognized more easily.

The operation of the second embodiment will be described next with reference to the flow chart of FIG. 15. In this embodiment, when a detachable memory 20 is to be detached from the terminal body, the data in a user memory 14 is transferred to the user area of the detachable memory 20, and the data in the user memory 14 is then cleared. In the embodiment, while the power switch is kept off, power is supplied to part of a control section 1 and an open lid state detection section 21a of a lock system 21. With this operation, upon detection of the open state of the lid, the open lid state detection section 21a outputs a detection signal to the control section 1.

Figure 15:
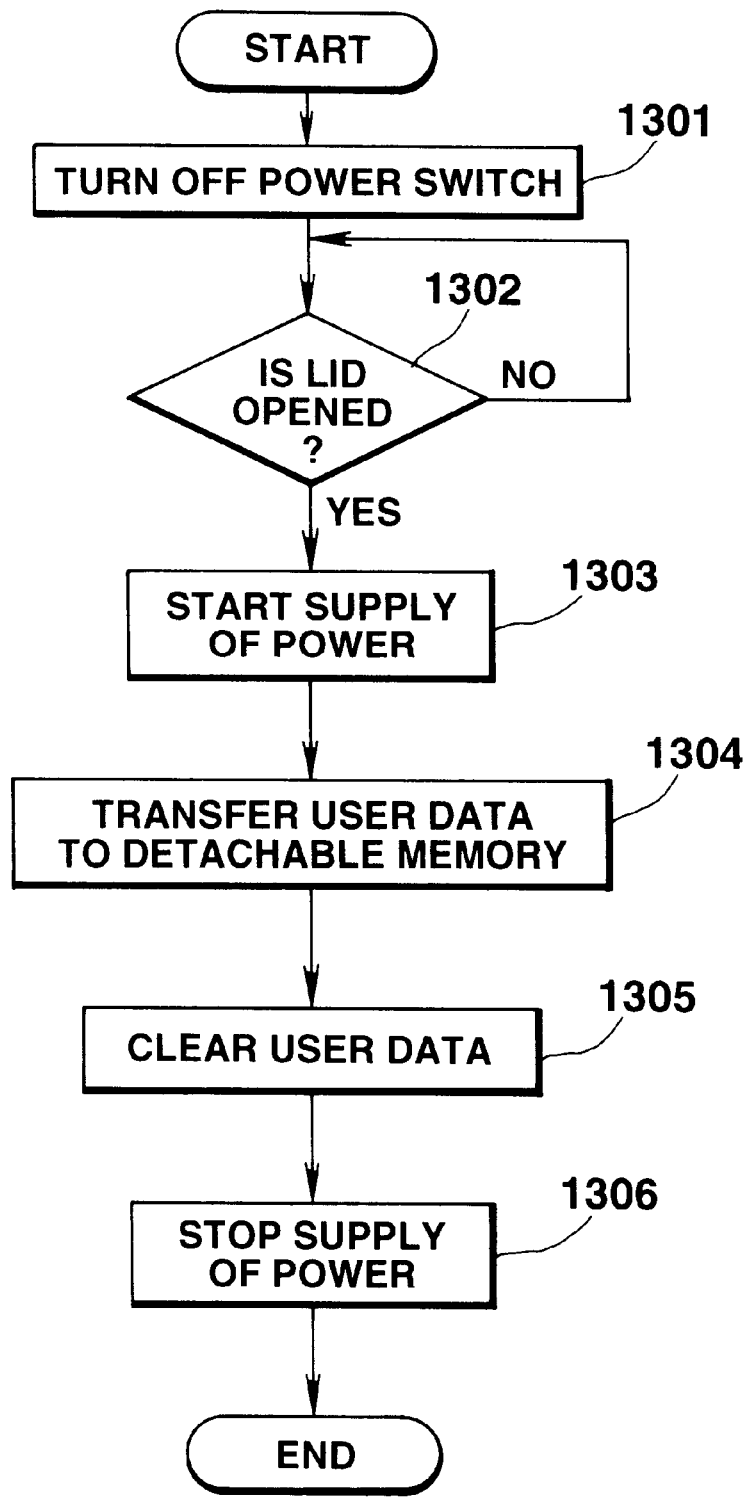
FIG. 15 is a flow chart for explaining the operation of the second embodiment of the present invention.

Referring to FIG. 15, a power switch 8n of a key input section 8 is operated to turn off the power (step 1301). As a result, the supply of power to each component is stopped. It is then checked on the basis of a detection signal from the open lid state detection section 21a whether a lid 31 of the housing portion for the detachable memory 20 is open (step 1302). If it is determined that the lid 31 is open, power is supplied to only predetermined portions (the control section 1 and its peripheral portions) (step 1303). The user data in the user memory 14 is transferred to the detachable memory 20 (step 1304). The user data in the user memory 14 is then cleared (step 1305). At the same time, the detachable memory 20 is unlocked, and the supply of power to the predetermined portions is stopped (step 1306).

With this operation, the user data in the main body can be cleared by detaching the detachable memory 20 from the main body. In using the terminal next time, when the detachable memory 20 is mounted in the main body, the previous state of the terminal can be restored by reading out the user data from the detachable memory 20 and writing the data in the user memory 14.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A portable radio communication apparatus which can be privately used by each of a plurality of users, the portable radio communication apparatus comprising:

input means for inputting discriminating information including communication information unique to each user;

identification information storing means for storing a plurality of identification information corresponding to each of the inputted discriminating information;

control means for causing said radio communication apparatus to operate for the private use of a specific user among the plurality of users on the basis of the communication information of the discriminating information; and notification means for detecting identification information read from said identification information storing means based on the discriminating information input to said input means.

2. An apparatus according to claim 1, wherein said input means comprises:
(a) housing means for temporarily housing a detachable storage medium in which the discriminating information unique to a user is stored, and
(b) means for reading the discriminating information unique to a user from said detachable storage medium.

3. An apparatus according to claim 2, wherein said input means comprises:

storage means for storing a code for identifying the usable detachable storage medium, first discrimination means for discriminating, on the basis of the code stored in said storage means, whether said detachable storage medium housed in said housing means can be used, and means for allowing said reading means to read out the discriminating information unique to the user from said detachable storage medium housed in said housing means when said first discrimination means discriminates that said detachable storage medium can be used.

4. An apparatus according to claim 3, wherein:

said input means further comprises means for inputting a password, and second discrimination means for discriminating whether the input password is a predetermined password, and said control means allows said portable radio communication apparatus to operate if said first discrimination means discriminates that said detachable storage medium can be used, and if said second discrimination means discriminates that the input password is the predetermined password.

5. A portable radio communication apparatus which can be privately used by each of a plurality of users, the portable radio communication apparatus comprising:

fixed memory means fixed in an apparatus body for storing discriminating information including communication information which is unique to a first user, housing means for temporarily housing a detachable storage medium in which discriminating information including communication information unique to a second user is stored, selection means for selecting whether to use the discriminating information unique to the first user which is stored in said fixed memory means or the discriminating information unique to the second user which is stored in said detachable storage medium, reading means for reading out the discriminating information unique to the user selected by said selection means, control means for causing said radio communication apparatus to operate for the private use of the selected user among the plurality of users on the basis of the communication information of the discriminating information read by said reading means, and notification means for notifying a current user who is using the apparatus as a private device.

6. An apparatus according to claim 5, wherein said reading means further comprises means for reading out the discriminating information unique to the user which is stored in said fixed memory means if said detachable storage medium is not housed in said housing means when said detachable storage medium is selected by said selection means.

7. An apparatus according to claim 5, wherein said control means comprises:

user information storage means in said apparatus body for temporarily storing the discriminating information unique to the user which is stored in said detachable storage medium, and means for causing the user information storage means in said apparatus body to store the discriminating information unique to the user which is stored in said detachable storage medium when said detachable storage medium is selected by said selection means.

8. An apparatus according to claim 1, wherein said notification means comprises means for performing a notifying operation when a power supply of an apparatus body is turned on, or when a key is operated.

9. An apparatus according to claim 1, wherein:

said apparatus further comprises a memory for storing user information, and said control means comprises means for inhibiting a third party from using the information stored in said memory.

10. An apparatus according to claim 2, wherein said apparatus further comprises:

a user record memory for storing a user record produced by communication, and means for erasing the record in said user record memory if a power supply of an apparatus body is turned on, the power supply of said apparatus body is turned off, a key is operated, said detachable storage medium is mounted, or said detachable storage medium is detached.

11. An apparatus according to claim 1, wherein said apparatus further comprises a user record memory for storing a user record produced by communication, and said control means comprises:

storing/holding means for storing/holding discriminating information unique to a user, which is input by said input means, until next information is input, comparing means for comparing the discriminating information input by said input means with the discriminating information unique to the user which is stored in said storing/holding means, and means for erasing the user record stored in said user record memory if said comparing means determines that the discriminating information unique to the user which is input by said input means does not coincide with the discriminating information unique to the user which is stored/held in said storing/holding means.

12. A radio communication apparatus which can be privately used by each of a plurality of users, comprising:

input means for inputting discriminating information including communication information unique to each user;

control means for causing said radio communication apparatus to operate for the private use of a specific user among the plurality of users on the basis of the communication information of the discriminating information input by said input means;

a memory for storing a user record produced by communication;

storing/holding means for storing/holding the discriminating information unique to a user, which is input by said input means, until a next discriminating information is input;

comparing means for comparing the discriminating information input by said input means with the discriminating information stored in said storing/holding means; and means for erasing the user record stored in said memory if said comparing means determines that the discriminating information input by said input means does not coincide with the discriminating information stored/held in said storing/holding means.

13. A portable radio communication apparatus which can be privately used by each of a plurality of users comprising:

housing means for temporarily housing a detachable storage medium in which discriminating information including communication information unique to a user is stored, said detachable storage medium having an identification code;

storage means for storing a plurality of identification codes corresponding to usable detachable storage mediums;

first comparing means for comparing the identification code stored in said detachable storage medium housed in said housing means with the identification codes stored in said storage means;

read means for reading out the discriminating information unique to the user from said detachable storage medium housed in said housing means when the identification code stored in said detachable storage medium coincides with a identification code stored in said storage means; and control means for causing said portable radio communication apparatus to operate for the private user of a specific user among the plurality of users on the basis of the communication information of the discriminating information unique to the user which is read out by said read means when said first comparing means determines that a identification code stored in the detachable storage medium coincides with the identification code stored in the storage means.

14. An apparatus according to claim 13, further comprising:

input means for inputting a password, and second comparing means for comparing whether the password input to said input means is a predetermined password, and wherein when said first comparing means determines that said detachable storage medium can be used, and said second comparing means determines that the input password is the predetermined password, said radio communication apparatus can be operated.

15. An apparatus according to claim 2, wherein said notification means comprises means for performing a notifying operation when said detachable storage medium is mounted to said housing means.

16. An apparatus according to claim 1, wherein said discriminating information unique to a user further comprises information for appeal to a user, and wherein:

said control means causes said radio communication apparatus to operate for the private use of a specific user among the plurality of users on the basis of said discriminating information for communication input by said input means; and wherein said notification means identifying a user who is using the apparatus as a private device on the basis of said information for appeal to a user input by said input means.

17. An apparatus according to claim 2, wherein said apparatus further comprises:

a user record memory for storing a user record produced by communication, said detachable storage medium comprises an area for storing a user record produced by communication, means for transmitting a user record stored in said user record memory to said area in said detachable storage medium if said detachable storage medium is detached from said housing means, and means for erasing the user record in said user record memory after completing of transmitting of said user record stored in said user record memory to said area in said detachable storage medium.

18. A portable radio communication apparatus which can be privately used by each of a plurality of users, the portable radio communication apparatus comprising:

a memory for storing user information;

input means for inputting discriminating information including communication information unique to each user;

first control means for causing said radio communication apparatus to operate for the private use of a specific user among the plurality of users on the basis of the communication information of the discriminating information; and second control means for inhibiting a third party from using the information stored in said memory.

19. A portable radio communication apparatus which can be privately used by each of a plurality of users, the portable radio communication apparatus comprising:

input means for inputting discriminating information including communication information unique to each user;

control means for causing said radio communication apparatus to operate for the private use of a specific user among the plurality of users on the basis of the communication information of the discriminating information;

a user record memory for storing a user record produced by communication; and means for erasing the record in said user record memory if a power supply of an apparatus body is turned on, the power supply of said apparatus body is turned off, or a key is operated.

20. An apparatus according to claim 19, wherein said input means comprises:

housing means for temporarily housing a detachable storage medium in which the discriminating information unique to a user is stored; and means for reading the discriminating information unique to a user from said detachable storage medium, wherein said erasing means erases the record in said user record memory if said detachable storage medium is mounted, or said detachable storage medium is detached.

21. A portable radio communication apparatus which can be privately used by each of a plurality of users, the portable radio communication apparatus comprising:

a user record memory for storing a user record produced by communication;

input means for inputting discriminating information including communication information unique to each user;

control means for causing said radio communication apparatus to operate for the private use of a specific user among the plurality of users on the basis of the communication information of the discriminating information, wherein said control means comprises:

storing/holding means for storing/holding discriminating information unique to a user, which is input by said input means, until next information is input;

comparing means for comparing the discriminating information input by said input means with the discriminating information unique to the user which is stored in said storing/holding means; and means for erasing the user record stored in said user record memory if said comparing means determines that the discriminating information unique to the user which is input by said input means does not coincide with the discriminating information unique to the user which is stored/held in said storing/holding means.

22. A portable radio communication apparatus which can be privately used by each of a plurality of users, the portable radio communication apparatus comprising:

housing means for temporarily housing a detachable storage medium in which a discriminating information unique to a user is stored and an area for storing a user record produced by communication;

means for reading the discriminating information unique to a user from said detachable storage medium;

control means for causing said radio communication apparatus to operate for the private use of a specific user among the plurality of users on the basis of the communication information of the discriminating information;

a user record memory for storing a user record produced by communication;

means for transmitting user records stored in said user record memory to said area in said detachable storage medium before said detachable storage medium is detached; and means for erasing said user record in said user record memory after completing transmission of said user records stored in said user records memory to said area in said detachable storage medium.

23. An apparatus according to claim 1, wherein said identification information includes information which identifies whether communication service is available.

* * * * *